(12) United States Patent
Kunisada et al.

(10) Patent No.: US 7,113,338 B2
(45) Date of Patent: Sep. 26, 2006

(54) THIN-FILM STRUCTURE AND METHOD FOR PRODUCING THE SAME

(75) Inventors: Terufusa Kunisada, Tokyo (JP); Satoru Kusaka, Tokyo (JP); Kenichi Nakama, Tokyo (JP)

(73) Assignee: Nippon Sheet Glass Co., Ltd., Tokyo (JP)

( * ) Notice: Subject to any disclaimer, the term of this patent is extended or adjusted under 35 U.S.C. 154(b) by 0 days.

(21) Appl. No.: 10/946,388

(22) Filed: Nov. 24, 2004

(65) Prior Publication Data
US 2005/0122588 A1 Jun. 9, 2005

(30) Foreign Application Priority Data
Nov. 28, 2003 (JP) ............... 2003-400284

(51) Int. Cl.
G02B 1/10 (2006.01)
(52) U.S. Cl. .............. 359/585; 359/589; 359/498
(58) Field of Classification Search ........... 359/585, 359/587, 589, 498
See application file for complete search history.

(56) References Cited

U.S. PATENT DOCUMENTS 6,108,131 A 8/2000 Hansen et al.
6,122,103 A 9/2000 Perkins et al.

FOREIGN PATENT DOCUMENTS

| JP | 04-218662 | 8/1992 |
|---|---|---|
| JP | 2002-296417 | 10/2002 |
| JP | 2003-215336 | 7/2003 |
| JP | 2003-344651 | 12/2003 |
| JP | 2004-070131 | 3/2004 |

OTHER PUBLICATIONS

Patent Abstracts of Japan for JP2002-296417 published on Oct. 9, 2002.
Patent Abstracts of Japan for JP04-218662 published on Aug. 10, 1992.

*Primary Examiner*—Fayez G. Assaf
(74) *Attorney, Agent, or Firm*—Darby & Darby (57) ABSTRACT

A thin-film structure includes plate-shaped metals or plate-shaped structures in which a plate-shaped metal and a plate-shaped dielectric are in contact. The plate-shaped metal or structures are formed on a transparent base having a surface with line-shaped corrugated structures. The plate-shaped metals or structures are perpendicular to or oblique to the surface of the base. The thin-film structure has characteristics suitable for polarizers used in liquid crystal projectors and the like.

12 Claims, 9 Drawing Sheets

THIN-FILM STRUCTURE AND METHOD FOR PRODUCING THE SAME

INCORPORATION BY REFERENCE

The present application claims priority under 35 U.S.C. §119 of Japanese Patent Application No. 2003-400284 filed on Nov. 28, 2003. The content of the application is incorporated herein by reference in its entirety.

BACKGROUND OF THE INVENTION

The present invention relates to a polarizer used in liquid crystal display devices, optical recording devices, optical sensors, and the like. More specifically, the present invention relates to a thin-film structure having polarization characteristics needed for polarizers and a method for making the same.

A polarizer is an optical element that extracts polarized light having a specific orientation from light containing multiple polarizations. Various types of polarizers have been proposed and implemented in practice. Examples include: polarized glass, in which column-shaped silver particles having high aspect ratios is dispersed in glass; polarizers in which island-shaped metal layers are alternated with dielectric layers and then drawn; polarized film, in which polymer is drawn and aligned; and stacked polarizers, in which dielectric films and metal films are stacked in an alternating manner and light is entered from the cross-section direction of the film.

In the field of liquid crystal technology, technical advances are being made in making optical systems more compact, light-weight, high-luminance, and the like. The popularity of liquid crystal display devices in applications such as business data display, home-theater video display and the like has been increasing rapidly. In particular, there have been significant advances in the increasing of luminance through the increasing of lamp luminance, the improving of light usage efficiency through polarization conversion and the like.

However, this has led to the problem of higher temperatures in the optical system resulting from greater compactness, higher luminance, and the like. As a result, there is a growing demand for heat-resistant properties in the optical components.

Liquid crystal display devices generally use a polarizing plate formed from an organic film with dye, as in Japanese laid-open patent publication number 2002-296417. However, with these polarizing plates with organic film, the heat resistant properties are low because of the use of organic material. Also, there are polarizing films that are dye-based and that have high heat resistance properties. However, these polarizing films have narrow working wavelength bands, thus imposing restrictions on use.

In order to overcome these problems, the use of wire-grid type polarizers has been proposed. In wire-grid type polarizers, the wire is metal and the substrate is glass so that only non-organic material is used. Thus, unlike organic materials such as the dye-based polarizers, high heat resistance properties can be provided. The wire-grid polarizers with the structures shown in U.S. Pat. No. 6,108,131 and U.S. Pat. No. 6,122,103 achieve these objects.

However, production of wire-grid polarizers requires high-precision control of wire thickness, distances between wires, and the like. In particular, production of a visible-light wire-grid polarizers require ultrafine structures where the width of a wire and a gap must be 160 nm or less. As a result, manufacturing technologies such as dry etching, photolithography, and the like must be used. The equipment needed for these technologies is costly and a large number of steps is needed, thus increasing production costs.

While the production of the polarizers described above all require complex steps, there have been attempts at forming a film having polarization splitting properties on a base using just a deposition process. In Japanese laid-open patent number Hei 4-218662, a metal (Al) and a transparent dielectric ($SiO_2$) are vaporized simultaneously on a flat substrate from facing diagonal directions to form a structure in which plate-shaped Al and $SiO_2$ are adhesed together and projected from the substrate. The adhesed plates have an average thickness of approximately 5 nm, a width of approximately 30 nm, and a height of approximately 1500 nm. This plate-shaped body is oriented roughly perpendicular to the direction from which vaporized particles come flying so that superior polarization characteristics are provided for visible light.

However, the results of follow-up tests conducted by the inventors showed that the structure of the plate-shaped body was near the surface of the substrate was completely different from that of the area around the upper end. Near the substrate, the metal formed fine particles and no plate-shaped structure is formed near the substrate. Furthermore, while plate-shaped structures are formed from approximately 50 nm away from the substrate surface, the cross-section shape of the plate-shaped metal changes as the distance from the substrate increases, and a widening along the thickness axis was observed. More specifically, it was not possible to obtain the film structure that was disclosed. Also, the extinction ratio of the polarizing film is approximately 5 db. This provides inadequate performance for a polarizer and prevents the technology from being used for optical communications, liquid crystal projectors, and the like.

OBJECT AND SUMMARY OF THE INVENTION

The object of the present invention is to overcome these problems and to provide, using only deposition technology, a structure on which plate-shaped bodies are arranged on a substrate surface, thus providing a low-cost polarizer with superior characteristics.

The present invention relates to thin-film structures having the following structure: a thin-film structure wherein a plurality of parallel plate-shaped metals are formed on a base on which is disposed a plurality of parallel line-shaped corrugated structures, the plate-shaped metals being disposed at a fixed angle with a base surface; and an end of the plate-shaped metal is in contact with the base along the direction of the line-shaped corrugated structure.

In this type of thin-film structure, when a working wavelength is $\lambda$, an average gap (d) between the plate-shaped metals, a film thickness (H), an average width (W), and an angle ($\theta$) relative to the base lie within the ranges. $\Theta$ is defined as the angle from the normal of the base surface.

$0.07\lambda < d < 0.20\lambda$ $0.15\lambda < H < 0.90\lambda$ $0.05\lambda < W < 0.18\lambda$ $0 \deg <= \theta <= 25 \deg$ It would be preferable for the film thickness (H) to be in the range $0.15\lambda < H < 0.50\lambda$.

By arranging multiple parallel metal plates on the base in this manner, polarization characteristics can be generated. More specifically, multiple parallel line-shaped corrugated structures are disposed on the base surface and the corrugated structures are used to arrange multiple plate-shaped metals parallel to each other on the base. These plate-shaped metals can be formed using only the deposition technology. Furthermore, by meeting the conditions described above, polarization effect is provided especially for the visible light range. Thus, this type of structure is especially suited for applications in thin-film polarizers.

Also, since corrugated structures are formed on the base surface, the base surface does not have a defined angle when looked at microscopically. However, since the corrugated structures are very fine, the base is a flat plate when looked at macroscopically and angles relative to the surface of this flat plate can be defined. This macroscopic surface of the base will be referred to as the base surface, and the microscopic surface of the base, which takes the corrugated structures into account, will be distinguished by being referred to as the corrugated structured surface.

It would be preferable for the base to be formed from a substrate on which a plurality of parallel line-shaped corrugated structures are disposed and a transparent dielectric film formed on the substrate surface from at least one layer; and for a surface shape of the line-shaped corrugated structures disposed on the substrate to be different from a surface shape of the transparent dielectric film.

In order to grow the plate-shaped metals described above on the substrate, the line-shaped corrugated structures on the substrate surface must have a certain depth and uniformity. However, with certain methods for forming corrugated structures, the necessary depth or uniformity may not be easily obtainable. In such cases, the corrugated structure depth can be supplemented or variations in the corrugated structures can be made uniform by forming a transparent dielectric film on the formed corrugated structure.

In particular, it would be preferable for the thickness of the transparent dielectric film at a crest of substrate projections to be greater than a thickness of the dielectric at a trough of substrate indentations. By forming the dielectric film in this manner, the depth of the substrate corrugated structures can be supplemented most effectively.

It would be preferable in the line-shaped corrugated structures for a cross-section perpendicular to the direction of the lines to form a periodic arrangement of a plurality of roughly similar trapezoids, bottom bases thereof being aligned on a single line parallel to the substrate surface; and for ends of the plate-shaped metals to be in contact with surfaces of the corrugated structured surface corresponding to legs of the trapezoids.

Furthermore, it would be preferable for the ends of the plate-shaped metals to be in contact with the two corrugated structured surfaces corresponding to two legs on either side of the top of the trapezoids. Alternatively, it would be preferable for the plate-shaped metals to be arranged at a period that is twice an arrangement period of the trapezoids.

The line-shaped corrugated structures described above can be formed by pressing a mold engraved which a plurality of parallel line-shaped corrugated structures against a sol or a gel of a transparent material applied to a flat substrate surface and heating the substrate.

By performing precision processing on the mold, even fine corrugated structures can be easily and repeatedly produced for a large number of bases.

Also, the line-shaped corrugated structures can be formed by scatching the substrate surface using particles such as polishing powder. Using this method, further cost reductions for corrugated structure formation are possible.

The plate-shaped dielectrics can be in contact with one side-surface of the plate-shaped metals. It would be preferable for the plate-shaped dielectric to be a material having as its main component silicon dioxide. When plate-shaped dielectrics and plate-shaped metals are adjacent in this manner, the metal is supported by the dielectric so that aggregation is restricted.

Furthermore, it would be preferable for gaps between the plate-shaped metals and gaps between the plate-shaped metals and the plate-shaped dielectrics to be filled and covered with a transparent dielectric having an index of refraction of no more than 1.6, and it would be preferable for the transparent dielectric to have as its main component silicon dioxide. Also, it would be preferable for the transparent dielectric film to cover the thin-film structure.

By using the transparent dielectric to fill and cover in this manner, the mechanical strength of the thin-film structure is improved and handling during the polarization production process is made easier. Also, durability can be improved and oxidation and aggregation due to heat can be prevented. As a result, a highly reliable polarizer can be provided. Also, if an inorganic film is used to cover the surface of the plate-shaped body, oxidation of the metal material can be prevented, thus improving heat resistance.

Also, it would be preferable for the plate-shaped metals to be formed from silver, aluminum, copper, platinum, or an alloy having as its main components these metals.

In a method for making a thin-film structure, metal ions or metal atoms or metal clusters are applied to a base formed with multiple line-shaped corrugated structures on its surface, the application being from an oblique direction relative to a normal of the substrate at a fixed angle relative to the direction of the line-shaped corrugated structures. At the same time or subsequently, metal ions or metal atoms or metal clusters are applied from a direction with the same angle but opposite from the fixed angle described above relative to the line-shaped corrugated structures and at an oblique direction relative to the normal of the macroscopic surface of the substrate. The substrate here is a flat member such as a glass plate and the base refers to the substrate with corrugated structures formed on the surface thereof.

When making a structure with plate-shaped dielectrics, at the same time as or subsequent to forming the plate-shaped metal film described above, ions or atoms or clusters for forming a dielectric are applied from a direction with the same angle but opposite from the fixed angle described above relative to the line-shaped corrugated structures and at an oblique direction relative to the normal of the macroscopic surface of the substrate.

These methods are based on vacuum deposition, so the production process is simple and deposition can take place over a large area, thus reducing production costs per unit area.

When corrugated structures are formed by scatching the substrate surface using particles such as abrasives, corrugated structures can be formed very inexpensively, but corrugated structures with depth that is adequate for forming the plate-shaped metals as described above cannot be obtained.

In such cases, ions, atoms, or clusters of an element for forming a dielectric is applied from a fixed angle relative to the direction of the line-shaped corrugated structures and at an oblique angle relative to the normal of the base surface. At the same time, ions, atoms, or clusters of the element for forming a dielectric are applied from the other side of the normal plane containing the corrugated structure lines.

Using this method, the corrugated structures can be made deeper and plate-shaped metals with uniform shapes can be formed more easily. Also, by adjusting the thickness of the dielectric film, variations in the corrugated structure shape can be made uniform.

According to the present invention, a film can be formed on a base using a film-forming process so that the film has superior polarization splitting characteristics and superior heat resistance characteristics. Also, since there is no photolithography step, large-area polarizers can be made inexpensively. Also, polarizers can be formed directly on optical parts.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

The thin-film polarizer of the present invention is produced by performing oblique-incidence deposition on a base with fine surface roughness, thus taking advantage of the fact that deposition will not take place at areas upon which shadows will form when seen from the direction of incidence of vaporized particles. The present inventors selected a dielectric material and metal material that would not form a solid solution in combination. These two materials are simultaneously applied for film-formation from an oblique incidence relative to the normal of the macroscopic surface of the base so that there is a fixed angle with the rough structure on the surface. It was found that phase separation of the two materials took place, with plate-shaped films being formed so that they are in contact with each other.

The macroscopic surface of the base refers to the following. Since the base surface is formed with projections and indentations, it is technically made up of surfaces with different orientation. However, if the base has a flat, plate shape when seen macroscopically, a macroscopic orientation of the surface can be determined. This plane is referred to as the base surface, and the surface with the fine roughness is referred to as the rough surface.

Furthermore, the present inventors found that when deposition is performed by simultaneously applying the two metals using an oblique incidence relative to the normal of the base surface and at an orientation that forms a fixed angle with the surface roughness, the plate-shaped metal film is formed so that it projects perpendicular centered at the high points of the surface roughness.

Because of its simplicity, molding is a preferable method for forming the roughness on the base. A transparent sol or a gel of a metal alkoxide can be applied to the base. Imprinting is performed using a mold in which multiple parallel indentations and projections are engraved as lines. The resulting structure is heated to form a rough structure having silicon dioxide as its main component and having superior durability. In addition, the use of resin materials suitable for molding is also well-known.

However, there are no special restrictions on the method used here. One alternative means is to use photolithography. In this method, patterns can be formed using electron-beam writing, interference lithography, or the like. Using this method, the photoresist or the like is exposed and developed and the substrate material is etched using the photoresist pattern or the like as a mask, resulting in a desired structure with fine roughness.

Alternatively, surface roughness formed by scatching a substrate surface using polishing powder or the like can be used. However, when a rough substrate is formed using this type of method, it is generally difficult to obtain deep roughness. Roughness formed using polishing powder or the like can generally only provide shallow roughness.

In such cases, when film is formed by applying a transparent dielectric material using an oblique incidence relative to the normal of the base surface at a direction that forms a fixed angle with the roughness, it was found that the plate-shaped transparent dielectric film can supplement roughness. Furthermore, it was found that roughness can be supplemented by applying dielectric material simultaneously from two opposing directions on either side of the substrate normal at a direction that forms a fixed angle.

By using this method, a shallow roughness can be improved to form deep roughness by using a transparent dielectric film. By applying a metal to this type of filmed substrate from an oblique direction, the creation of a thin-film structure having a polarization function can be made easier.

In wire-grid polarizers, which are formed with gaps, the plate-shaped metal that provides the polarization characteristics can oxidize or can aggregate, thus leading to life-span problems. Similar problems occur with the thin-film structure of the present invention because there are gaps between plate-shaped metal. One means for overcoming this problem is to fill the gaps in the thin-film polarizer with various materials such as $SiO_2$, $Al_2O_3$, $SiO_xN_y$, $Si_3N_4$, or the like, once the thin-film polarizer is completed. More specifically, the injection of $SiO_2$, which is a transparent inorganic material, into the gaps is preferable because the lifespan can be significantly improved. There are no special restrictions on the application method, however, and various methods can be used, e.g., paint coating, chemical vapor deposition, and physical vapor deposition.

In polarization films used in liquid crystal display devices, the most important characteristics are the degree of polarization and the maximum transmissivity for linearly polarized light. The degree of polarization is a value calculated according to the equation:

Degree of polarization (%)=($I$max−$I$min)/($I$max+$I$min)×100%

Where Imax is the maximum transmissivity for linearly polarized light and Imin in the minimum transmissivity for linearly polarized light. It would be preferable in terms of ease of use for the optical characteristics of transmissivity and degree of polarization to be minimally dependent on wavelength and incidence angle.

Specific embodiments will be described below. In the figures, like elements will be assigned like numerals and corresponding descriptions may be omitted.

[First Embodiment]

Figure 1:
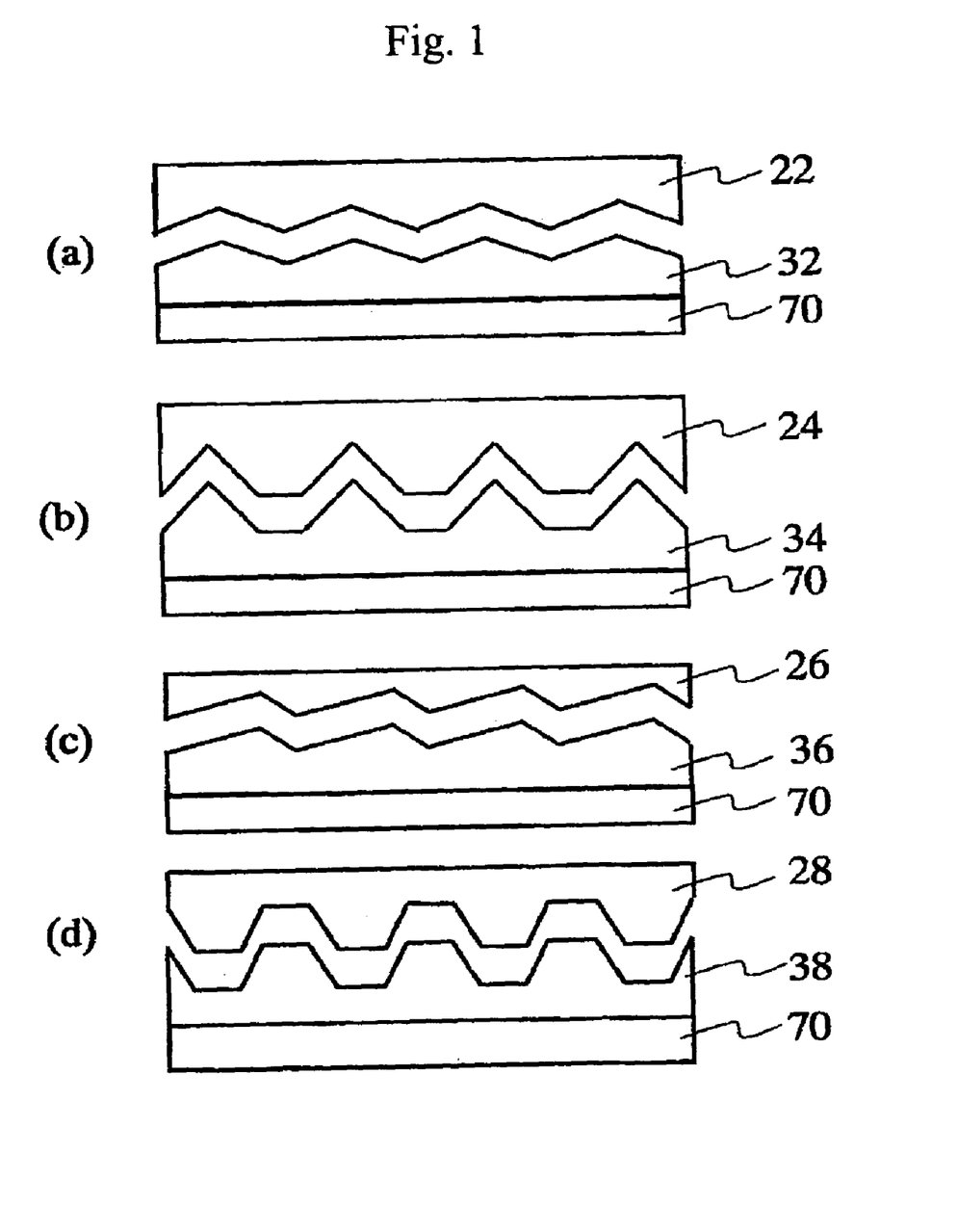
FIG. 1 shows simplified cross-section drawings of corrugated structures on bases and molds used to make these corrugated structures according to the present invention.

In this embodiment, line-shaped roughness is formed by molding. FIG. 1 shows various cross-sections of the line-shaped roughness molded in this manner, with the cross-sections being perpendicular to the lines. A spin coater is used to apply a tetraethoxysilane (TEOS)-based sol film on a quartz glass plate. In this embodiment, a mold 22 having the cross-section shape shown in FIG. 1(a) is pressed against this. The structure is then heated and dried and then the mold is released. After these operations, a heat of 600 deg C. is applied so that a rough film 32 having $SiO_2$ as its main component is formed on a glass substrate 70.

Figure 10:
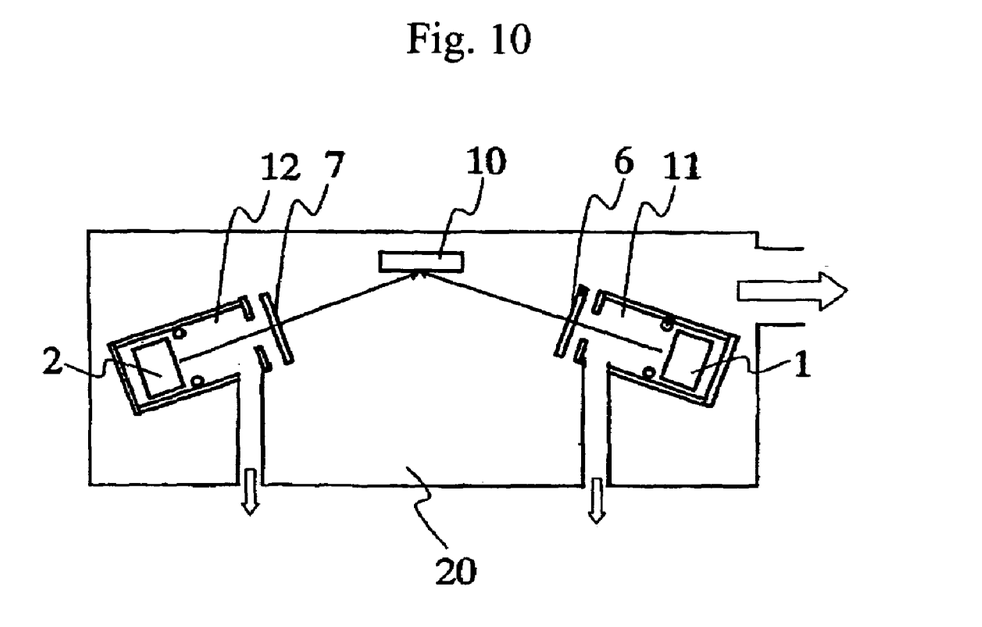
FIG. 10 is a drawing showing the structure of a device used to form a thin-film structure according to the present invention.

Next, an AgPd alloy target (Pd: 2 wt % added) is attached to a magnetron cathode 1 of the long-distance sputtering device shown in FIG. 10, and an $SiO_2$ target is attached to a magnetron cathode 2. The quartz glass substrate with the rough surface described above is attached at the position of the base 10 shown in FIG. 10. The magnetron cathode 1 is inclined 80 deg relative to the normal of the base 10, and the magnetron cathode 2 is inclined 80 deg.

Then, a rotary pump and a cryopump are used to evacuate in a sputter chamber 20 to approximately $1\times10^{-4}$. Argon gas is introduced into a target chamber 11 and an argon gas with 2% oxygen is introduced into a target chamber 12. Then, a DC power supply sends a negative potential to the magnetron cathode 1 to form a glow discharge. Also, a radio frequency (frequency: 13.56 MHz) is sent to the magnetron cathode 2 to generate a glow discharge.

Next, the power supplied to the magnetron cathode 1 is adjusted so that the AgPd deposition rate (the rate at which the plate-shaped metal grows) on the surface of the base 10 is 10 nm/min. Also, the high-frequency power to the magnetron cathode 2 is adjusted so that the deposition rate of the $SiO_2$ film on the surface of the base 10 is 10 nm/min.

Next, a shutter 6 and a shutter 7 attached to the front surfaces of the magnetron cathode 1 and the magnetron cathode 2 are opened at the same time to begin deposition, and this proceeds for approximately 20 minutes. After 20 minutes, the shutter 6 and the shutter 7 are closed at the same time, concluding the film-formation operation.

Figure 2:
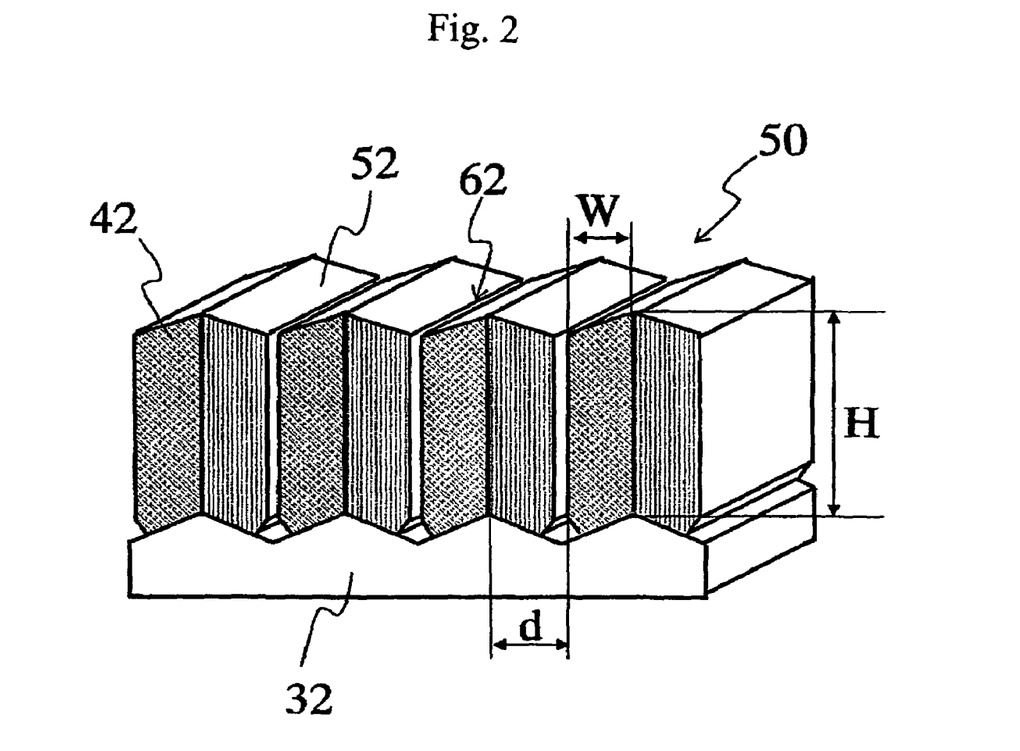
FIG. 2 is a simplified drawing of a thin-film structure according to the present invention.

The perspective drawing in FIG. 2 shows the structure that was seen when the cross-section structure of the sample obtained in this manner was observed with a transmission electron microscope (TEM). On the rough film 32 (the quartz glass substrate is not shown in the figure), plate-shaped dielectrics 52 having $SiO_2$ as their main component and plate-shaped metals 42 having AgPd alloy (Pd: 2 wt %) are formed in contact with each other and arranged on the projections of the rough film 32.

A plate-shaped structure 50 is projected roughly perpendicular to the base surface (the surface of the rough film 32 as seen macroscopically), and gaps 62 are formed between individual plate-shaped structures. Based on the cross-section structure observed with a TEM, the shape was found to be as follows:

$d$=75 nm (corresponds to 0.14λ when λ=550 nm)

$W$=50 nm (corresponds to 0.09λ when λ=550 nm)

$H$=200 nm (corresponds to 0.36λ when λ=550 nm)

θ=0 deg where d is the average distance between plate-shaped metals, H is the film thickness, i.e., height, W is the width, and θ is the angle.

The degree of polarization measured for an incident light wavelength of 632.8 nm was 99.9% or higher, and the transmissivity for TM polarized light was 88.2%, these values being adequately high. Table 1 shows measurement results for 400 nm, 550 nm, and 700 nm. For all of these wavelengths, the degree of polarization and the transmissivity were found to be high.

[Second Embodiment]

In this embodiment, sputtering is used to apply an $SiO_2$ film with a thickness of approximately 100 nm to cover the surface of the plate-shaped structure made in the first embodiment. The degree of polarization measured for an incident light wavelength of 632.8 nm was found to be 99.9% or higher, and transmissivity for TM polarized light was found to be 89.7%, these values being adequately high. As Table 1 shows, similar characteristics were found for other wavelengths.

The sample above was heated for 1 hour at 500 deg C. in the atmosphere. Table 1 shows the results of optical measurements performed after this operation. Optical characteristics roughly identical to the pre-heated state were maintained, and it was found that covering the plate-shaped structure with a dielectric film provided an extremely high degree of heat resistance.

[Third Embodiment]

In this embodiment, the surface of an aluminosilicate glass substrate was abraded using polishing powder (particle diameter: 100 nm) to form line-shaped corrugated structures on the glass surface. The surface corrugated structure structure on the substrate is similar in shape to that of the first embodiment, but the corrugated structure was much more shallow, with the average depth being approximately 15 nm. The average corrugated structure period was 130 nm.

The following operation was performed in order to accentuate the corrugated structure depth through the formation of a film to cover the surface. Si targets (B dope) were attached to the magnetron cathode 1 and the magnetron cathode 2 in the long-distance sputtering device shown in FIG. 10. A glass substrate having the corrugated structured structure described above was then attached to the position of the base 10 shown in FIG. 10. The magnetron cathode 1 was inclined 80 deg relative to the normal direction of the attached substrate, and the magnetron cathode 2 was inclined 80 deg.

Then, a rotary pump and a cryopump were used to exhaust the pressure in the sputter chamber 20 to approximately $1 \times 10^{-4}$ Pa. An oxygen gas with 20% argon was introduced to the target chamber 11 and the target chamber 12. The pressure at that point in the sputter chamber was $3 \times 10^{-2}$ Pa. Then, a negative potential was applied to the magnetron cathode 1 and the magnetron cathode 2 using a DC pulse power supply, resulting in a glow discharge.

Next, the power to the magnetron cathode 1 and the magnetron cathode 2 was adjusted so that the $SiO_2$ deposition rate on the surface of the glass substrate was 10 nm/min.

Then, the shutters 6, 7 attached to the front surfaces of the magnetron cathode 1 and the magnetron cathode 2 were opened simultaneously to begin deposition, and this was sustained for approximately 5 minutes. After 5 minutes, the two shutters 6, 7 were closed at the same time and deposition was concluded.

Figure 3:
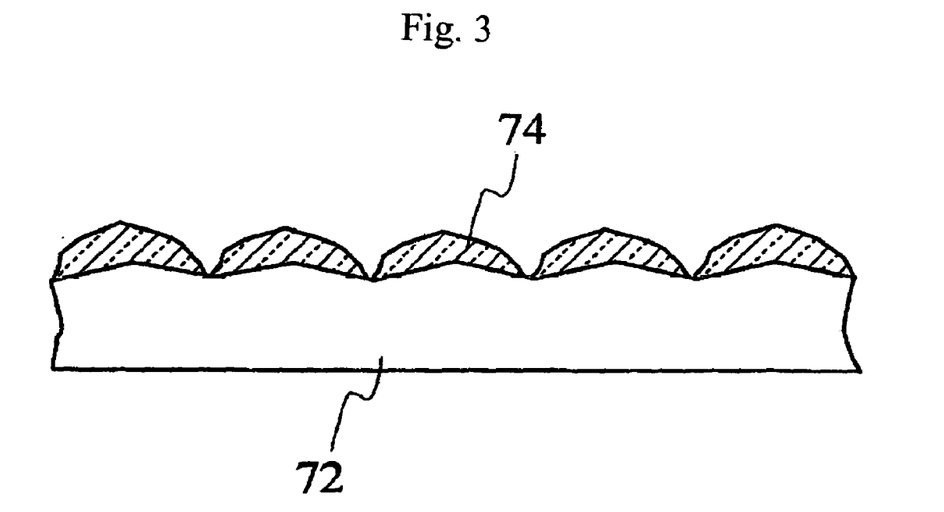
FIG. 3 is a cross-section structure of a base on which an operation was performed to supplement a corrugated structure.

The cross-section structure of the base obtained in this manner was observed with a transmission electron microscope (TEM), and the cross-section structure shown in FIG. 3 was observed. Transparent dielectric films 74 formed from $SiO_2$ on the projections of the corrugated structured glass substrate 72 were thicker than the film formed on the indentations. The average depth of the indentations was approximately 50 nm, which is deeper than the 15 nm depth of the corrugated structure on the corrugated structured glass substrate 72 itself. Thus, the period of the corrugated structure was maintained while the depth was increased.

Next, films of AgPd and $SiO_2$ were formed at the same time under conditions similar to those from the first embodiment. The cross-section shape of the resulting sample was observed under a transmission electron microscope (TEM), and the structure shown in the perspective drawing in FIG. 4 was seen. In order to show the characteristics of the transparent dielectric film 74 formed to supplement the corrugated structure of the substrate 72, the corrugated structure is illustrated in an exaggerated manner. The plate-shaped dielectrics 52 formed with $SiO_2$ as the main component and the plate-shaped metals 42 formed with AgPd alloy as the main component are arranged in contact with each other in the projections on the base.

Figure 4:
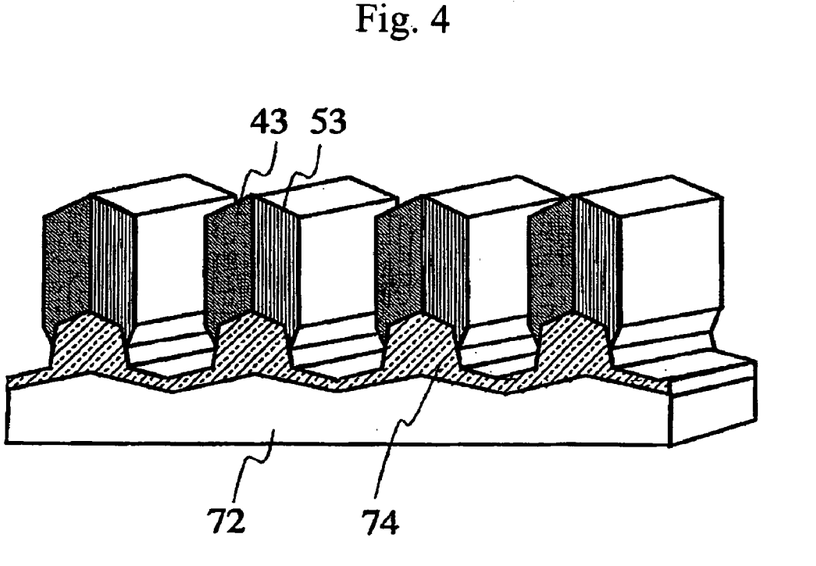
FIG. 4 is a simplified drawing showing an example of a thin-film structure according to the present invention.

The plate-shaped structures appear projecting perpendicular to the macroscopic surface, and gaps are present between the plate-shaped structures. Based on the cross-section structure observed with a TEM, the shape was found to be as follows:

$d=75$ nm (corresponds to $0.14\lambda$ when $\lambda=550$ nm)

$W=50$ nm (corresponds to $0.09\lambda$ when $\lambda=550$ nm)

$H=200$ nm (corresponds to $0.36\lambda$ when $\lambda=550$ nm)

$\theta=0$ deg where d is the average distance between plate-shaped metals, H is the film thickness, W is the width, and $\theta$ is the angle.

The degree of polarization was measured for an incident wavelength of 632.8 nm was 99.9% or higher, and the transmissivity for TM polarized light was 88.2%, these values being adequately high. Table 1 shows measurement results for 400 nm, 550 nm, and 700 nm. For all of these wavelengths, the degree of polarization and the transmissivity were found to be high.

[Fourth Embodiment]

Various types of thin-film structures were formed on the base surface by varying the corrugated structured film, the incident angle of the metal particles used during deposition, and the incident angle of the particles forming the dielectric.

Figure 5:
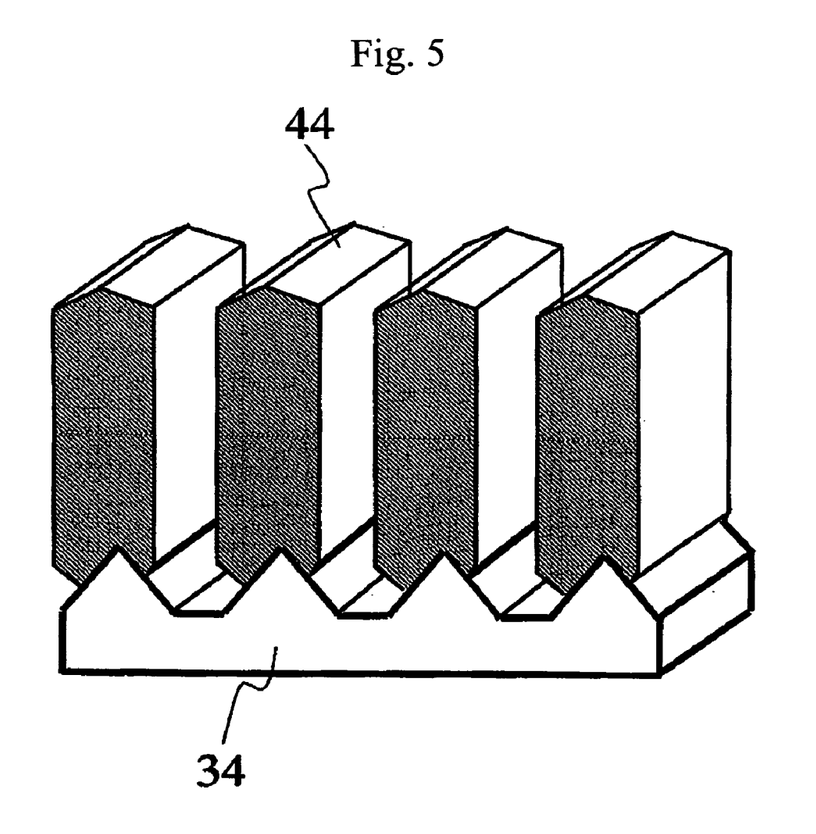
FIG. 5 is a simplified drawing showing another example of a thin-film structure according to the present invention.

In a fourth embodiment, the mold 24 shown in FIG. 1(b) was used to form a corrugated structured film 34 on a base. Using this base, AgPd particles were applied obliquely from either side, resulting in plate-shaped metals 44 shown in FIG. 5 attached to both sloped surfaces of the projections on the base surface.

[Fifth Embodiment]

Figure 6:
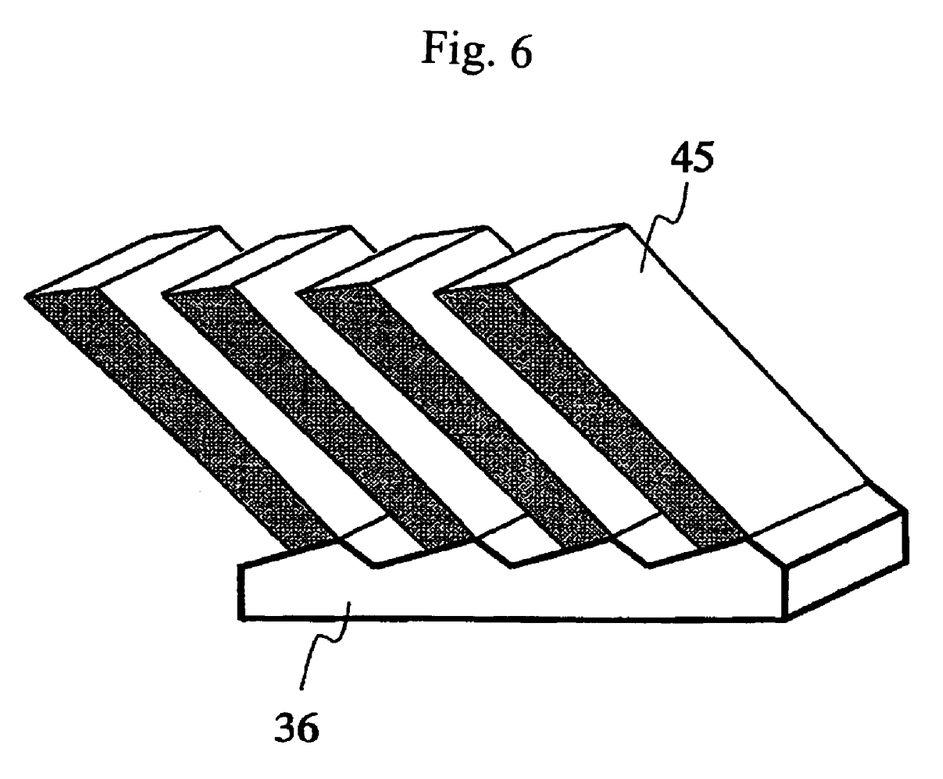
FIG. 6 is a simplified drawing showing another example of a thin-film structure according to the present invention.

In a fifth embodiment, a corrugated structured film 36 was formed using a mold 26 shown in FIG. 1(c). Using this base, AgPd particles were applied from one oblique direction. Plate-shaped metals 46, as shown in FIG. 6, were formed on the sloped surfaces to one side of the base surface, forming an angle with the normal of the macroscopic surface of the base.

[Sixth Embodiment]

Figure 7:
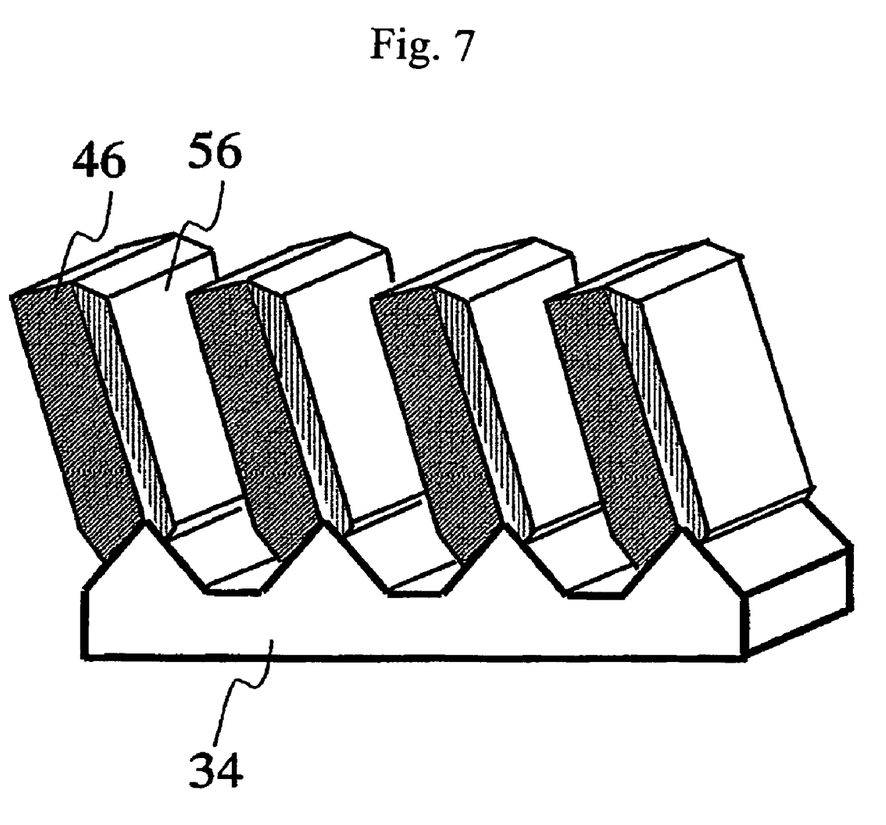
FIG. 7 is a simplified drawing showing another example of a thin-film structure according to the present invention.

In a sixth embodiment, a corrugated structured film 34 was formed using the mold 24 similar to that of the fourth embodiment. Next, AgPd and $SiO_2$ targets were arranged at positions that form 45 deg and 80 deg angles relative to the normal of the base 10. Otherwise, conditions similar to those of the first embodiment were used to form a film. As a result, plate-shaped dielectrics 58 having $SiO_2$ as the main component and plate-shaped metals 48 having AgPd as the main component were formed adhesed in contact with each other and in contact with the sloped surfaces on both sides of the projections of the corrugated structured film 34. The plate-shaped structures were sloped relative to the normal of the base surface (the macroscopic surface of the corrugated structured film 34).

The shape and the dimensions of the plate-shaped structures from the fourth embodiment through the sixth embodiment were determined and the degree of polarization for 400 nm, 550 nm, and 700 nm light and transmissivity for TM polarized light were measured. The results are shown in Table 1. All the structures showed degrees of polarization of at least 90% and transmissivity for TM polarized light of at least 50%, which are sufficiently high values of polarization splitting and transmissivity.

[Seventh Embodiment]

Figure 8:
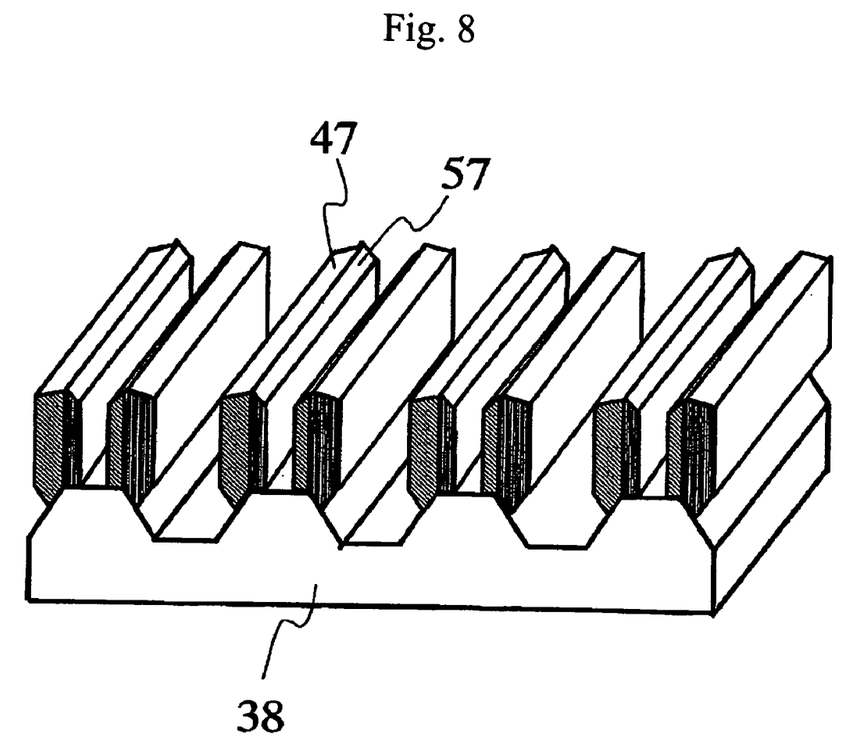
FIG. 8 is a simplified drawing showing another example of a thin-film structure according to the present invention.

In this embodiment, a mold 28 with trapezoidal cross-section shapes was used to form a corrugated structured film 38. Next, using conditions similar to those of the first embodiment, AgPd and $SiO_2$ films were formed at the same time. For the AgPd alloy, however, 10 wt % of Pd was used. The cross-section structure of the obtained sample was observed with a TEM and is shown in the perspective drawing in FIG. 8. Plate-shaped dielectrics 58 having $SiO_2$ as the main component and plate-shaped metals having AgPd alloy as the main component are formed in contact with each other and arranged on the projections of the base. The major difference from the first embodiment and the like, however, is that the plate-shaped structures are formed at twice the repetition period of the corrugated structure period of the base. This is because the plate-shaped dielectrics and the plate-shaped metals are formed in an alternating manner on the sloped surfaces and the upper flat surfaces of the trapezoidal sections of the base. Thus, a structure can be obtained that is finer than the period used for forming the base.

[Eighth Embodiment]

Figure 9:
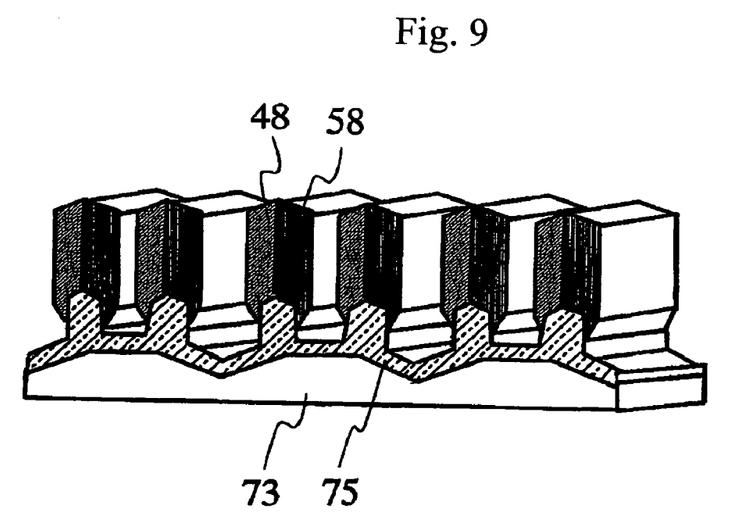
FIG. 9 is a simplified drawing showing another example of a thin-film structure according to the present invention.

As in the third embodiment, this embodiment uses polishing powder to abrade the surface of an aluminosilicate glass substrate, forming line-shaped corrugated structures on the glass surface. The simplified structure of the surface corrugated structure of this corrugated structured substrate 73 consists, as shown in FIG. 9, of trapezoids formed with the flat sections of the original substrate surface that remained. The indentations in this case were also very shallow, with an average depth of approximately 15 nm. The average corrugated structure period was 130 nm.

In order to supplement the corrugated structure depth by covering the surface, a transparent dielectric film ($SiO_2$ film) 75 was formed as in the third embodiment. As in the third embodiment, the surface corrugated structure depth was increased to approximately 50 nm. However, unlike the third embodiment, the dielectric film 75 is thicker where the trapezoid legs meet the top base. As a result, not only does the dielectric film 75 supplement corrugated structure depth, but it also serves to make the corrugated structure period double the period of the substrate.

Next, AgPd and $SiO_2$ films are formed at the same time under conditions similar to those of the first embodiment. The cross-section shape of the obtained sample was observed with a TEM and was as shown in FIG. 9. The plate-shaped dielectrics 59 having $SiO_2$ as the main component and the plate-shaped metals 49 having AgPd alloy as the main component were arranged in contact with each other on the projections of the base. The period of the plate-shaped structures matches the period of the base surface, i.e., the corrugated structure period of the dielectric film 75.

[First Comparative Example]

Drops of an epoxy-based ultraviolet-setting resin were applied to a quartz glass substrate, which was then pressed against a mold 22 formed with the corrugated structure shown in FIG. 1(a). From this state, ultraviolet rays were applied for 2 minutes, and the substrate was then released from the mold. This resulted in a corrugated structured film 32 formed from epoxy resin on the glass substrate 70.

Figure 14:
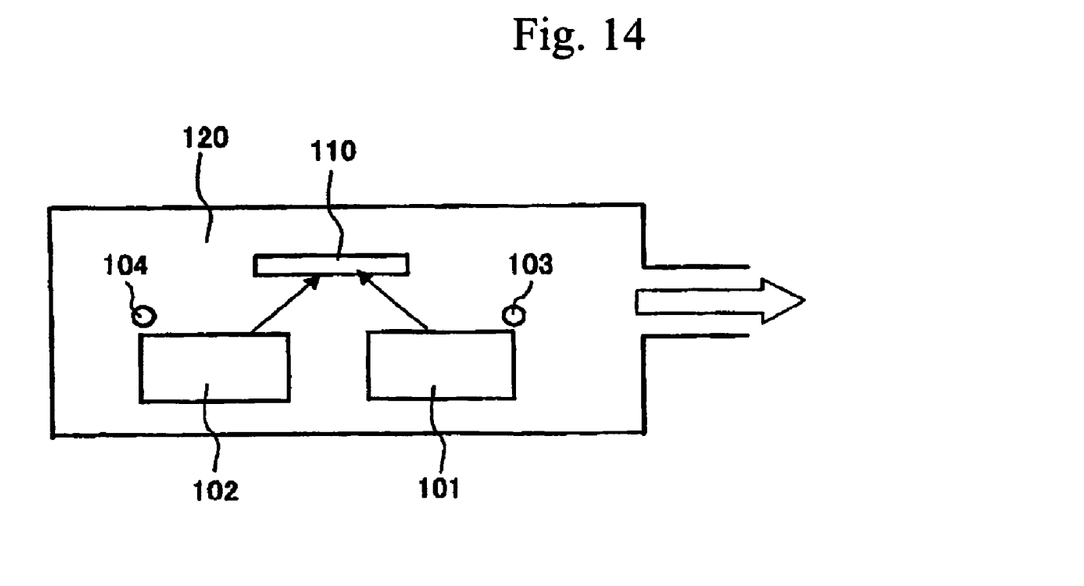
FIG. 14 is a drawing showing the structure of a conventional film-forming device.

In a magnetron sputtering device shown in FIG. 14, a gold target is attached to a magnetron cathode 101 and an $SiO_2$ target is attached to a magnetron cathode 102. The corrugated structured quartz glass substrate is attached to the position of a base 110 shown in FIG. 14.

Then, a rotary pump and a cryopump are used to evacuate inside the sputter chamber 120 to approximately $1 \times 10^{-4}$ Pa. Argon gas is supplied to the magnetron cathode 101 by way of a gas supply tube 103, and argon gas with 5% oxygen is supplied to the magnetron cathode 102 by way of a gas supply tube 104. The pressure in the sputter chamber 120 at this point was $5 \times 10^{-1}$ Pa. The mean free path under this pressure is approximately 30 mm. With a mean free path of this extent, the sputter particles are dispersed by gas molecules before they reach the substrate, and the particle path direction is lost.

Next, a negative potential was applied to the magnetron cathode 101 using a DC power supply, resulting in a glow discharge. A radio frequency (frequency: 13.56 MHz) was then applied to the magnetron cathode 102, resulting in a glow discharge.

Next, the power supplied to the magnetron cathode 101 was adjusted so that gold is deposited on the base 110 at a rate of 7 nm/min. Also, the high-frequency power applied to the magnetron cathode 102 is adjusted so that $SiO_2$ is deposited on the surface of the base 110 at a rate of 7 nm/min.

Next, shutters (not shown) attached to the front surfaces of the magnetron cathode 101 and the magnetron cathode 102 are opened at the same time to begin deposition, and this state is maintained for approximately 25 minutes. After 90 minutes, the two shutters are closed at the same time, completing the film-forming operation.

The cross-section shape of the sample obtained in this manner was observed with a transmission electron microscope, and it was found that fine Au particles were dispersed in the $SiO_2$ film. The degree of polarization for an incident light wavelength of 550 nm was measured and found to be 34.0%, and transmissivity for TM polarized light was found to be 24.5%.

Even if a corrugated structure is formed on the substrate, the resulting polarization characteristics will be inferior and unsuitable for use as a polarizer if deposition takes place under conditions involving a short mean free path where particle flight direction is lost.

[Second Comparative Example]

Figure 12:
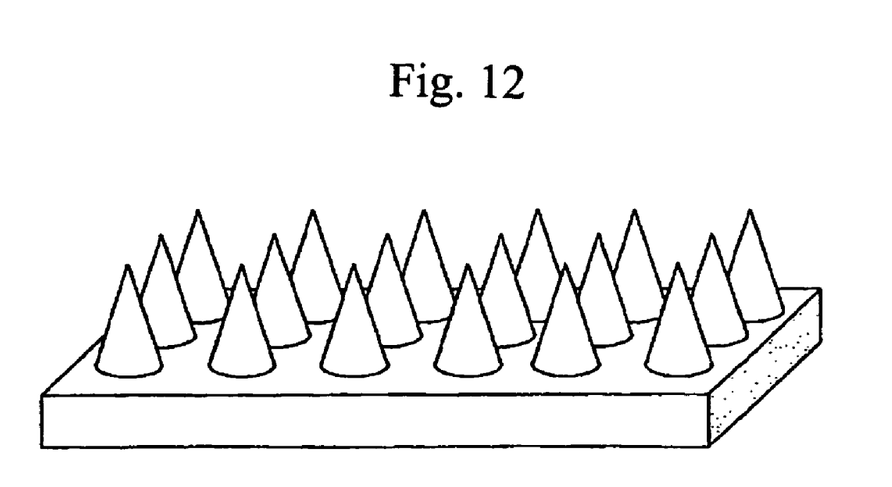
FIG. 12 is a perspective drawing showing the structure of a base in which a second comparative example is implemented.

Deposition using a method similar to that of the first embodiment was performed on a transparent substrate having a conical corrugated structure as shown in FIG. 12. The cross-section of the sample obtained in this manner was observed using a transmission electron microscope, and it was found that poles formed from $SiO_2$ and AgPd were formed on the apexes of the cones while no clear structures were found elsewhere. The degree of polarization measured for incident light wavelength of 550 nm was 5% and the transmissivity for TM polarized light was 8.7%.

Even if a corrugated structure is formed on the substrate and deposition is performed with a mean free path is suitably long, if there is no directionality to the corrugated structure the resulting polarization characteristics will be inferior and unsuitable for use as a visible-light polarizer.

[Third Comparative Example]

An epoxy-based ultraviolet-setting resin was applied to a quartz glass substrate, and against it was pressed a mold 22 formed with the corrugated structure shown in FIG. 1(a). Ultraviolet rays were applied for approximately 2 minutes in this state, and the substrate was then released from the mold. As a result, a corrugated structured film 32 formed from epoxy resin was formed on a glass substrate 70.

Next, a copper target was attached to the magnetron cathode 1 of the long-distance sputtering device shown in FIG. 10, and an $SiO_2$ target was attached to the magnetron cathode 2. The magnetron cathode 1 was inclined to 80 deg relative the normal of the base 10, and the magnetron cathode 2 was inclined to 80 deg.

After discharging, argon gas was introduced into the target chamber 11 and argon gas with 5% oxygen was introduced into the target chamber 12. The pressure in the sputter chamber at this point was $3 \times 10^{-2}$ Pa.

Next, the power supplied to the magnetron cathode 1 was adjusted so that copper is deposited on the surface of the base 10 at a rate (growth rate of the length of plate-shaped metal) of 5.5 nm/min. Also, high-frequency power applied to the magnetron cathode 2 was adjusted so that the $SiO_2$ film is deposited on the surface of the base 10 at a rate of 5.5 nm/min.

Then, the shutters 6, 7 attached to the front surfaces of the magnetron cathode 1 and the magnetron cathode 2 were opened at the same time to begin deposition, and this was maintained for approximately 40 minutes. After 40 minutes, the two shutters 6, 7 were closed at the same time, and deposition was stopped.

The cross-section structure of a sample obtained in this manner was observed using a transmission electron microscope, and it was found to be as shown in the simplified drawing in FIG. 2. On the quartz glass substrate with the resin corrugated structured film 32, plate-shaped dielectrics 52 having $SiO_2$ as the main component and the plate-shaped metals 42 having copper as the main component were formed in contact with each other and arranged along the projections of the base corrugated structure.

The plate-shaped structures were projected parallel to the normal of the surface of the substrate 32, and gaps were present between the plate-shaped structures. Based on the cross-section structure observed with a transmission electron microscope, the shape was found to be as follows:

$d$=63 nm (corresponds to $0.11\lambda$ when $\lambda$=550 nm)

$W$=35 nm (corresponds to $0.06\lambda$ when $\lambda$=550 nm)

$H$=396 nm (corresponds to $0.72\lambda$ when $\lambda$=550 nm)

$\theta$=0 deg where d is the average distance between plate-shaped metals, H is the film thickness, i.e., height, W is the width, and $\theta$ is the angle.

The degree of polarization was measured for incident light wavelengths of 400 nm, 550 nm, and 700 nm, and all of these were 99.9%. However, transmissivity for TM polarized light was 28.2%, 50.8%, and 89.9%, with transmissivity for a wavelength of 400 nm being a low value of no more than 30%.

[Fourth Comparative Example]

Figure 13:
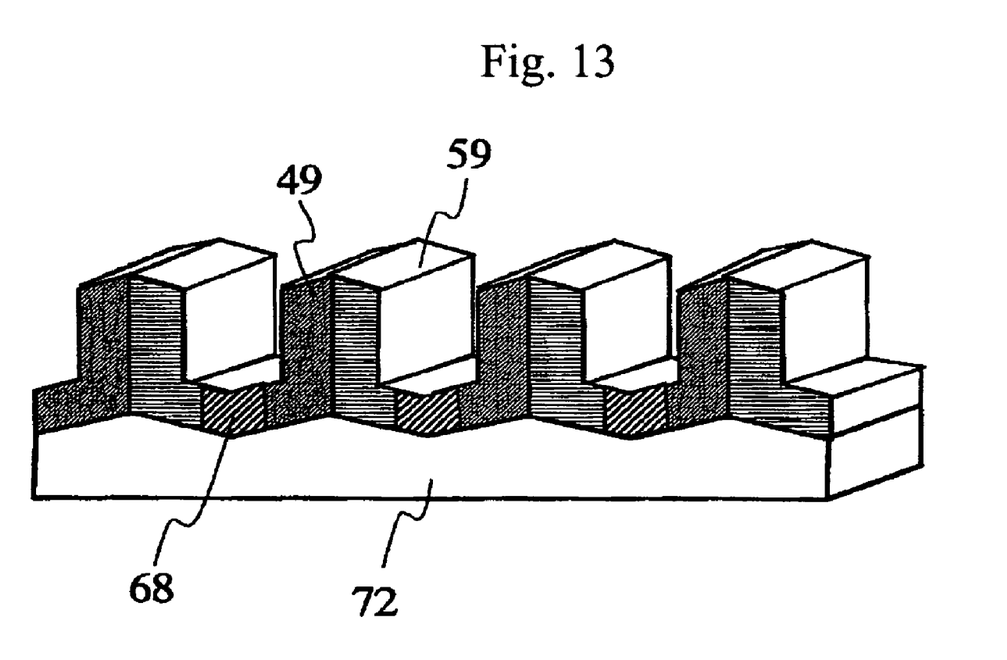
FIG. 13 is a simplified drawing showing the thin-film structure according to a fourth comparative example.

As in the third embodiment, polishing powder (particle diameter: 100 nm) were used to abrade the surface of an aluminosilicate glass substrate, forming line-shaped corrugated structures on the glass surface. On this base 72, AgPd and $SiO_2$ were used form a film under the conditions similar to those of the first embodiment.

The cross-section structure of a sample obtained in this manner was observed using a transmission electron microscope (TEM), and it was found to be roughly as shown in the perspective drawing in FIG. 13. Plate-shaped dielectrics 59 having $SiO_2$ as the main component and the plate-shaped metals 49 having AgPd alloy (Pd: 2 wt %) as the main component were formed in contact with each other and arranged along the projections of the corrugated structured substrate 72. These plate-shaped structures were projected parallel to normal of the macroscopic surface of the substrate, and gaps were present between these plate-shaped structures. However, in the sections corresponding to the indentations of the substrate, AgPd and $SiO_2$ film were mixed, forming a layer 68 in which fine AgPd particles were in an $SiO_2$ film.

The degree of polarization for incident light wavelength 632.8 nm was measured and found to be 90.2% or higher, but the transmissivity for TM polarized light was low, at 32%. The measurement results for 400 nm, 550 nm, and 700 nm wavelengths are shown in Table 1. For all wavelengths, the degree of polarization were high but the transmissivity was low.

[Fifth through Seventh Comparative Examples]

Thin-film structures were formed using methods similar to those used in the first embodiment. However, the shape of the base surface corrugated structure was changed by using various different mold shapes. Furthermore, the incidence angles for the particles forming the dielectric and the metal particles used in deposition were changed. The cross-section shapes for these were observed with a TEM and the shape and the dimensions of the corrugated structures were determined.

Furthermore, the degrees of polarization and TM polarized light transmissivity were measured for 400 nm, 500 nm, and 700 nm wavelength light. The results, as shown in Table 1, all indicated either a degree of polarization of 90% or less or a TM polarized light transmissivity of 50% or less. Thus, none of the samples were adequate for use in polarizers. Thus, even if the structures shown in FIG. 2 or FIG. 4 through FIG. 9 are formed, polarization splitting characteristics for predetermined wavelengths were not adequate if the dimensions and shapes were not appropriate.

Taking the embodiments and the comparative example described above into account, it can be seen that there are preferable ranges for the average distance between plate-shaped metals (d), film thickness (H), average width (W), and angle relative to the base ($\theta$). The preferable ranges are related to the wavelength being used ($\lambda$). By using thin-film structures with shapes and dimensions within the ranges below as related to the wavelength of the light used, the polarization characteristics for the wavelength can be improved.

$0.07\lambda < d < 0.20\lambda$ $0.15\lambda < H < 0.90\lambda$ $0.05\lambda < W < 0.18\lambda$ $0 \deg <= \theta <= 25 \deg$ In order to obtain a thin-film structure having a shape described above, there are no particular restrictions as long as parallel line-shaped corrugated structures on the base are shaped so that the cross-section as seen perpendicular to the line has an apex, but it would be preferable for the cross-section to be a projection formed as a triangular shape with one apex and two sides. It would be preferable for the distance between an apex of a projection and an apex of a projection to be in a range similar to that of d above.

Also, the cross-section shape can be the top base and two legs of a trapezoid. In this case, the projections can be formed with a period double d, and the corrugated structure can be formed easily on the substrate. However, the distances between the projections do not have to follow a fixed period. In fact, it would be preferable for there to be variations in the distances between projection apexes since this would reduce insertion loss.

In addition to the methods described above, photolithography involving an electron beam writing device or the like can be used to form these corrugated structures on a base surface.

In the embodiments described above, $SiO_2$ was used for the dielectric layer, but other materials that are transparent for the wavelength region being used and that have low indices of refraction can be used. Thus, $SiO_2$, $SiO_xN_y$, $Al_2O_3$, $MgF_2$, MgO, and the like can be used for deposition using long-distance sputtering as described above. However, a lower index of refraction is preferable to reduce insertion loss, and $MgF_2$, $SiO_2$, $SiO_xN_y$, and the like would be especially preferable.

In addition to single metals such as silver, platinum, copper, aluminum, and the like, it would also be possible to use silver-palladium alloy, gold-copper alloy, silver-zinc alloy, silver-aluminum alloy, aluminum-neodymium alloy, and the like.

Also, in selecting the dielectric material and the metal material, a combination that forms a solid solution is not preferable. In such cases, the metal and the dielectric would mix so that the desired plate-shaped film would not be obtained.

In the plate-shaped structure of the present invention, there is no need for a high-temperature process. As a result, there are no special restrictions on the material for the base. In addition to quartz glass, silicon, borosilicate glass, soda lime glass, and the like, resin material can be used as well.

Furthermore, there are no special restrictions on the cross-section shape of the base, and the present invention is not restricted to the shapes of the embodiments described above shown in FIG. 1(a) through FIG. 1(d). Curved corrugated structures such as waveform shapes can be used as well. Corrugated structures can also be formed directly on lens surfaces having curved surfaces and optical parts such as prisms without resulting in thermal damage.

Any film-formation method can be used as long as the particles to be deposited as described above can be applied with directionality. In addition to the methods described above, physical film-forming methods such as ion-beam sputtering and magnetron sputtering using a collimator fall under this condition.

Figure 11:
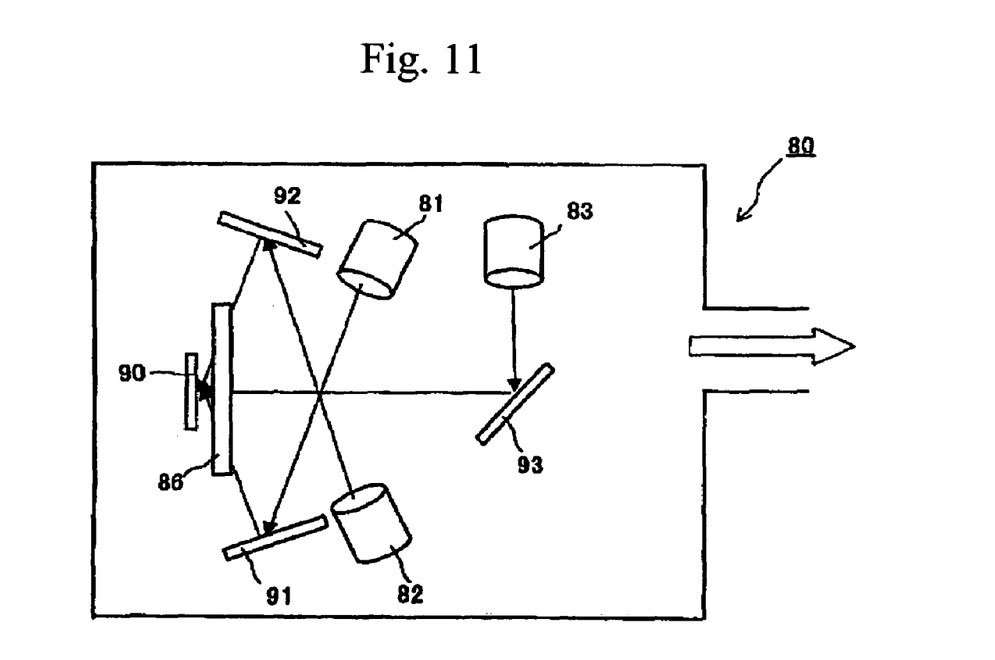
FIG. 11 is a drawing showing the structure of another device used to form a thin-film structure according to the present invention.

The ion-beam sputtering method shown in FIG. 11 is preferable because the gas pressure between the target and the substrate is low (approximately $1 \times 10^{-2}$ Pa) during deposition and the mean free path is large. This ion beam sputtering device 80 exhausts the device to a relatively low pressure using a single exhaust system. Ion beams from multiple ion guns 81, 82, 83 are applied to targets 91, 92, 93, and a thin film is formed on a base 90. Deposition is controlled with a shutter 86. However, this ion-beam sputtering method requires both ion guns and targets, making the device complicated. Also, setting up appropriate ion beam incidence angles involves difficulties in the design and production of the device.

Figure 15:
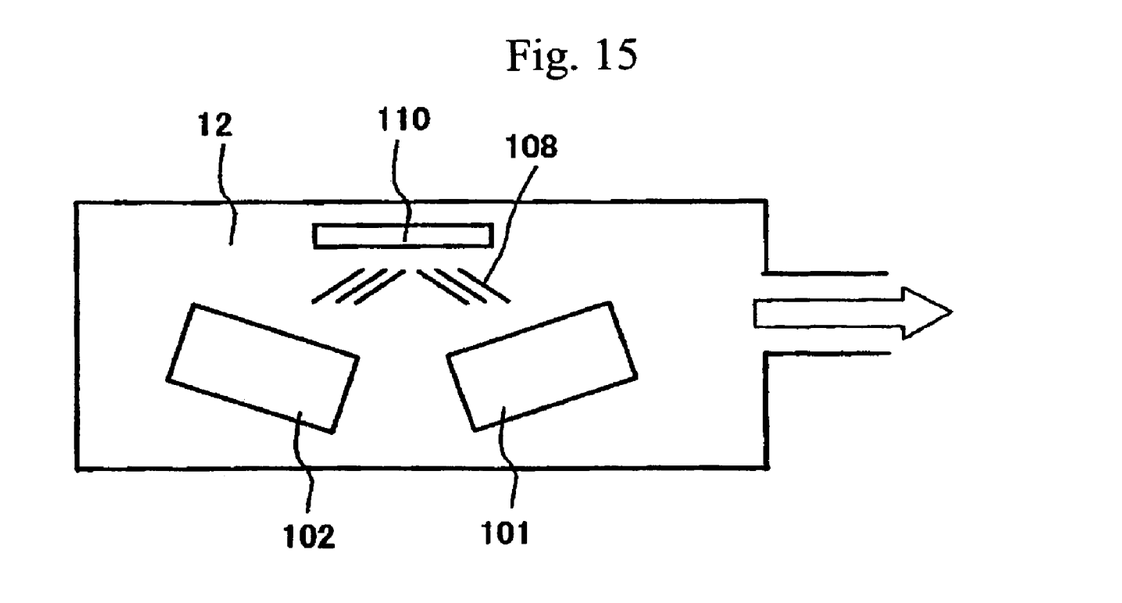
FIG. 15 is a drawing showing the structure of an improved conventional film-forming device.

The process pressure in standard magnetron sputtering as illustrated in FIG. 14 is at least 0.1 Pa. Thus, it is difficult to obtain a film with plate-shaped structures as illustrated in the first comparative example. When this type of standard magnetron sputtering device is used, modifications must be made such as inserting collimators 108 between the sputter targets and the substrate as shown in FIG. 15 in order to make the directions of the vaporized particles uniform.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A thin-film structure comprising:
   a base on which is disposed a plurality of parallel line-shaped corrugated structures;
   a plurality of parallel plate-shaped metals provided on said base, said plate-shaped metals being disposed at a fixed angle with a surface of said base, and an end of each plate-shaped metal being in contact with said base along the direction of said line-shaped corrugated structure,
   wherein an average gap (d) between said plate-shaped metals, a film thickness (H), and an average width (W), in terms of a working wavelength λ, and an angle (θ) relative to said base lie within the following ranges:

$0.07\lambda < d < 0.20\lambda$ $0.15\lambda < H < 0.90\lambda$ $0.05\lambda < W < 0.18\lambda$ $0 \text{ deg} <= \theta <= 25 \text{ deg};$ said base is formed from a substrate on which the plurality of parallel line-shaped corrugated structures are disposed and a transparent dielectric film of at least one layer is disposed on said substrate; and
   a surface shape of said line-shaped corrugated structures disposed on said substrate is different from a surface shape of said transparent dielectric film.

2. The thin-film structure as described in claim 1 wherein said transparent dielectric film is thicker at a crest of said corrugated structure on the substrate than at a trough of said corrugated structure.

3. The thin-film structure as described in claim 1 wherein:
   said line-shaped corrugated structures has a cross-section that forms a periodic arrangement of similar trapezoids, each trapezoid on either side has a bottom base that meets said substrate surface in a single line; and
   ends of said plate-shaped metals are provided on said corrugated structures corresponding to legs of said trapezoids.

4. The thin-film structure as described in claim 3 wherein said ends of said plate-shaped metals are in contact with two planes of said corrugated structures corresponding to two legs on either side of the top of said trapezoids.

5. The thin-film structure as described in claim 4 wherein said plate-shaped metals are arranged at a twice the period of said trapezoids.

6. The thin-film structure as described in claim 1 wherein said line-shaped corrugated structures are formed by pressing a mold engraved with a plurality of parallel line-shaped corrugated structures against a sol or a gel of a transparent material applied to a flat substrate surface and heating said substrate.

7. The thin-film structure as described in claim 1 wherein said line-shaped corrugated structures are formed by scratching a substrate surface using an abrasive.

8. The thin-film structure as described in claim 1 wherein a plate-shaped dielectric is in contact with one side of a surface of said plate-shaped metal.

9. The thin-film structure as described in claim 8 wherein said plate-shaped dielectric as its main component comprises silicon dioxide.

10. The thin-film structure as described in claim 1 wherein gaps between said plate-shaped metals and gaps between said plate-shaped metals and said plate-shaped dielectrics are filled and covered with a transparent dielectric having an index of refraction of no more than 1.6.

11. The thin-film structure as described in claim 1 wherein a transparent dielectric film covers an upper surface of said thin-film structure.

12. The thin-film structure as described in claim 1 wherein said plate-shaped metals comprise silver, aluminum, copper, platinum, or an alloy of these metals.

* * * * *